US008689191B2

(12) United States Patent
Dolby et al.

(10) Patent No.: US 8,689,191 B2
(45) Date of Patent: Apr. 1, 2014

(54) CORRECT REFACTORING OF CONCURRENT SOFTWARE

(75) Inventors: Julian Dolby, Bronx, NY (US); Max Schaefer, St. Clement's (GB); Manu Sridharan, Boulder, CO (US); Frank Tip, Ridgewood, NJ (US); Emina Torlak, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 1062 days.

(21) Appl. No.: 12/718,648

(22) Filed: Mar. 5, 2010

(65) Prior Publication Data

US 2011/0219361 A1    Sep. 8, 2011

(51) Int. Cl.
*G06F 9/45* (2006.01)

(52) U.S. Cl.
USPC ............................. 717/136; 717/144; 717/146

(58) Field of Classification Search
None
See application file for complete search history.

(56) References Cited

U.S. PATENT DOCUMENTS

| 7,370,318 B1* | 5/2008 | Howe et al. | 717/110 |
| 7,627,861 B2* | 12/2009 | Smith et al. | 717/144 |
| 2005/0235270 A1* | 10/2005 | Sanyal | 717/136 |
| 2006/0277529 A1* | 12/2006 | Michimoto et al. | 717/136 |
| 2008/0052685 A1* | 2/2008 | Jeong et al. | 717/136 |
| 2008/0229278 A1* | 9/2008 | Liu et al. | 717/106 |
| 2009/0133006 A1* | 5/2009 | Cheung | 717/144 |
| 2009/0254892 A1* | 10/2009 | Yamashita | 717/146 |
| 2010/0077380 A1* | 3/2010 | Baker et al. | 717/120 |
| 2010/0077386 A1* | 3/2010 | Akkiraju et al. | 717/136 |
| 2010/0269103 A1* | 10/2010 | Wu et al. | 717/146 |
| 2011/0067016 A1* | 3/2011 | Mizrachi et al. | 717/149 |
| 2011/0202907 A1* | 8/2011 | Dice et al. | 717/148 |
| 2011/0209132 A1* | 8/2011 | Faes et al. | 717/168 |
| 2012/0144376 A1* | 6/2012 | Van Eijndhoven et al. | 717/146 |

OTHER PUBLICATIONS

Mens et al., "A survey of software refactoring," 2004, IEEE Transactions on Software Engineering (vol. 30, Issue: 2), pp. 126-139.*
Mens et al., "Analysing refactoring dependencies using graph transformation," Software & Systems Modeling, Sep. 2007, vol. 6, Issue 3, pp. 269-285.*

(Continued)

*Primary Examiner* — Thuy Dao
*Assistant Examiner* — Stephen Berman
(74) *Attorney, Agent, or Firm* — Jon A. Gibbons; Fleit Gibbons Gutman Bongini & Bianco PL

(57) ABSTRACT

Automated refactorings as implemented in modern IDEs for Java usually make no special provisions for concurrent code. Thus, refactored programs may exhibit unexpected new concurrent behaviors. We analyze the types of such behavioral changes caused by current refactoring engines and develop techniques to make them behavior-preserving, ranging from simple techniques to deal with concurrency-related language constructs to a framework that computes and tracks synchronization dependencies. By basing our development directly on the Java Memory Model we can state and prove precise correctness results about refactoring concurrent programs. We show that a broad range of refactorings are not influenced by concurrency at all, whereas other important refactorings can be made behavior-preserving for correctly synchronized programs by using our framework. Experience with a prototype implementation shows that our techniques are easy to implement and require only minimal changes to existing refactoring engines.

20 Claims, 7 Drawing Sheets

(56) References Cited

OTHER PUBLICATIONS

Roberts, "Practical Analysis for Refactoring," 1999, Department of Computer Science, University of Illinois at Urbana-Champaign, downloaded on Nov. 8, 2013 from the internet: <url>: http://toritama.cin.ufpe.br/twiki/pub/SPG/WeeklySeminar/PracticalAnalysisForRefactoringDonRoberts1999.pdf, pp. 1-137.*

Pietro Cenciarelli and Alexander Knapp and Eleonora Sibilio, The Java memory model: Operationally, denotationally, axiomatically. European Symposium on Programming, 2007.

Jan Wloka and Manu Sridharan and Frank Tip, Refactoring for reentrancy. In ESEC/SIGSOFT FSE, pp. 173-182, 2009.

Danny Dig and John Marrero and Michael D. Ernst, Refactoring sequential Java code for concurrency via concurrent libraries. In ICSE, pp. 397-407, 2009.

Jaroslav Sevcik and David Aspinall, On validity of program transformations in the java memory model. In ECOOP 2008 (2008), pp. 27-51.

Max Schafer and Torbjorn Ekman and Oege De Moor, Sound and extensible renaming for java, Proceedings of the 23rd ACM SIGPLAN conference on Object-oriented programming systems languages and applications, Oct. 19-23, 2008, Nashville, TN, USA.

Jeremy Manson and William Pugh and Sarita V. Adve, The Java memory model, Proceedings of the 32nd ACM SIGPLAN-SIGACT symposium on Principles of programming languages, p. 378-391, Jan. 12-14, 2005, Long Beach, California, USA.

Danny Dig and Marius Minea and Mihai Tarce and Ralph Johnson and Cosmin Radoi, ReLooper: Refactoring for Loop Parallelism in Java, in OOPSLA' 09, Oct. 25-29, 2009, Orlando Florida.

Shane Markstrum and Robert M. Fuhrer and Todd Millstein, Towards Concurrency Refactoring for X10, in PPoPP' 09, Feb. 14-18, 2009, Raleigh North Carolina.

Max Schafer and Mathieu Verbaere and Torbjorn Ekman and Oege De Moor, Stepping Stones over the Refactoring Rubicon Lightweight Language Extensions to Easily Realise Refactorings, ECOOP 2009—Object-Oriented Programming, 23rd European Conference, Genoa, Italy, Jul. 6-10, 2009. Proceedings.

* cited by examiner

```
class C1 implements TM {
static class Super {
  static int x, y;
}
static class Sub extends
Super {
  static synchronized void
  m() {
    ++x; ++y;
  }
  static synchronized void
  n() {
    if (x != y) {
    print("bug"); }
  }
}
public void m1() {
Sub.m(); }
public void m2() {
Sub.n(); } }
          (a)
```

FIG. 1A

```
class C1 implements TM {
  static class Super {
   static int x, y; static
   synchronized void m() {
      ++x; ++y;
} } static class Sub
extends Super {
   static synchronized
   void n() { if (x != y)
   { print("bug"); }
} } public void m1() {
Super.m(); } public void
m2() { Sub.n(); }
}
          (b)
```

FIG. 1B

```
class C2 implements TM {
static class A {
synchronized static void m() {}
synchronized static void n() {}
}
static class B {}
public void m1() {
synchronized (B.class) { A.m(); }
}
public void m2() {
synchronized (A.class) { A.n(); }
}
}

```
class C2 implements TM {
static class A {
synchronized static void m() {}
}
static class B {
synchronized static void n() {}
}
public void m1() {
synchronized (B.class) { A.m(); }
}
public void m2() {
synchronized (A.class) { B.n(); }
}
}

```
class C3 implements TM {
int f;
public void m1() {
int g = 0;
synchronized (this) {
g = f;
}
if (g % 2 != 0) { print("bug"); }
synchronized (this) { g = f; }
}
public synchronized void m2() {
++f; ++f;
}
}

```
class C3 implements TM {
int f;
public void m1() {
int g = 0;
int n = f;
synchronized (this) {
g = n;
}
if (g % 2 != 0) { print("bug"); }
synchronized (this) { g = n; }
}
public synchronized void m2() {
++f; ++f;
}
}

```
class C4 implements TM {
static volatile boolean a = false;
static volatile boolean b = false;
public void m1() {
boolean x = (a = true);
while (!b);
if (x);
print("m1 finished");
}
public void m2() {
while (!a);
b = true;
print("m2 finished");
}
}

```
class C4 implements TM {
static volatile boolean a = false;
static volatile boolean b = false;
public void m1() {
while (!b);
if ((a = true));
print("m1 finished");
}
public void m2() {
while (!a);
b = true;
print("m2 finished");
}
}

```
class C5 implements TM {              class C5 implements TM {
int x = 0; int y = 0;                 int x = 0; int y = 0;
int z = 0;                            AtomicInteger z = new AtomicInteger(0);
public void m1() {                    public void m1() {
int r1 = x;                           int r1 = x;
synchronized (this) {}                synchronized (this) {}
y = 1;                                y = 1;
print(r1);                            print(r1);
}                                     }
public void m2() {                    public void m2() {
int r2 = y;                           int r2 = y;
synchronized (this) { z++; }          z.getAndIncrement();
x = 1;                                x = 1;
print(r2);                            print(r2);
}                                     }
}                                     }
(a)                                   (b)
```

FIG. 5A    FIG. 5B

|  | Normal Access | Volatile Read, Monitor Enter | Volatile Write, Monitor Exit |
|---|---|---|---|
| Normal Access |  |  | X |
| Volatile Read, Monitor Enter | X | X | X |
| Volatile Write, Monitor Exit |  | X | X |

FIG. 6

```
class C6 implements TM {
int x = 0, y = 0;
public void m1() {
int tmp = x;
y = tmp+tmp;
}
public void m2() {
x = 1;
}
}
```

```
class C6 implements TM {
int x = 0, y = 0;
public void m1() {
y = x+x;
}
public void m2() {
x = 1;
}
}
```

| benchmark | total | synch | no synch | aborted | mean analyzed | % no synch |
|---|---|---|---|---|---|---|
| antlr | 2680 | 617 | 2063 | 2 | 4.2 | 76.98% |
| bloat | 4094 | 740 | 3354 | 156 | 13.0 | 81.92% |
| chart | 6607 | 694 | 5913 | 85 | 8.5 | 89.50% |
| eclipse | 3726 | 924 | 2802 | 30 | 6.4 | 75.20% |
| fop | 5653 | 706 | 4947 | 26 | 5.0 | 87.51% |
| hsqldb | 5457 | 1212 | 4254 | 62 | 6.4 | 77.79% |
| jython | 8755 | 1543 | 7212 | 334 | 14.3 | 82.38% |
| luindex | 2737 | 511 | 2226 | 16 | 6.2 | 81.33% |
| pmd | 4121 | 530 | 3591 | 105 | 9.2 | 87.14% |
| xalan | 5821 | 858 | 4963 | 31 | 7.7 | 85.26% |
| apache-ant | 10486 | 2876 | 7610 | 96 | 6.1 | 72.57% | number of methods

FIG. 8

```
interface TM { void m1(); void m2(); }
class Harness {
public static void runInParallel(final TM tm) {
Thread t1 = new Thread(new Runnable() {
public void run() { tm.m1(); } });
Thread t2 = new Thread(new Runnable() {
public void run() { tm.m2(); } });
t1.start(); t2.start();
}
}
```

CORRECT REFACTORING OF CONCURRENT SOFTWARE

STATEMENT REGARDING FEDERALLY SPONSORED RESEARCH

Not Applicable.

FIELD OF THE INVENTION

The present invention generally relates to the field of programming and more particularly to how refactoring transformations can be implemented correctly for concurrent object-oriented programs.

DESCRIPTION OF RELATED ART

Ever since its inception, Java has offered strong support for writing concurrent code, and with the increasing prevalence of multicore processors in recent years, concurrent programming has become crucial to exploiting these architectures. It may, then, come as a surprise that many of the most frequently used refactorings as implemented in modern Java IDEs are not concurrency-aware. When applied to concurrent programs, even refactorings that work reliably for sequential code may introduce concurrency bugs in the form of unexpected new behavior, race conditions, deadlocks, or livelocks.

For sequential programs, the refactoring community has generally down-played the importance of ensuring that refactoring engines handle all corner cases correctly [27—Note: the use of bracket numbers e.g. [nn], refers to materials listed at the end of this patent.], instead encouraging developers to use regression tests to ensure that refactorings do not change program behavior. But this approach is likely to be much less effective in a concurrent setting: concurrency bugs like race conditions may only occur on particular hardware or with a very rare thread schedule, making it much more difficult to gain confidence in a refactoring via regression testing.

While there has been some work on new refactorings designed specifically to improve the concurrent behavior of existing code [7, 8, 23, 34], the correctness of traditional refactorings on concurrent code is not well studied. In his classic guide to refactorings, Fowler cautions that "these refactorings . . . are described with single-process software in mind" and anticipates that refactorings for concurrent software will be quite different [11].

SUMMARY OF THE INVENTION

Disclosed is a method and system for automated refactorings as implemented in modern integrated development environments (IDEs) for Java. Such refactoring usually make no special provisions for concurrent code. Thus, refactored programs may exhibit unexpected new concurrent behaviors. We analyze the types of such behavioral changes caused by current refactoring engines and develop techniques to make them behavior-preserving, ranging from simple techniques to deal with concurrency-related language constructs to a framework that computes and tracks synchronization dependencies. By basing our development directly on the Java Memory Model we can state and prove precise correctness results about refactoring concurrent programs. We show that a broad range of refactorings are not influenced by concurrency at all, whereas other important refactorings can be made behavior-preserving for correctly synchronized programs by using our framework. Experience with a prototype implementation shows that our techniques are easy to implement and require only minimal changes to existing refactoring engines.

In one embodiment, the method for behavior-preserving transformation of a concurrent program invention begins with source code being received with a proposed refactoring operation to be performed. The source code may include synchronization blocks as part of the concurrent program. Next, the source code is transformed by applying the proposed refactoring operation to create a transformed source code. An intermediate representation of the source code including synchronization dependence edges is created. An intermediate representation of the transformed source code including synchronization dependence edges is created. The intermediate representation for the source code and the intermediate representation for the transformed source code is compared. This comparison is used to determine if synchronization dependence edges are equivalent to ensure concurrent behavior-preservation. Depending on the results of the comparison, the transformed source code is saved or an error is produced.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings.

FIG. 1 illustrates a code sample of how the PULL UP MEMBER refactoring can change program behavior.

FIG. 2 illustrates a code sample of how the MOVE refactoring may change program behavior.

FIG. 3 illustrates a code sample of how the EXTRACT LOCAL refactoring may change program behavior.

FIG. 4 illustrates a code sample of how the INLINE LOCAL refactoring may change program behavior.

FIG. 5 illustrates a code sample of how the CONVERT INT TO ACCOMICINTEGER refactoring may change program behavior.

FIG. 6 is a table of JMM Reordering Matrix.

FIG. 7 illustrates a code sample of Inline Local applied to tmp in m1( ).

FIG. 8 is a table of analysis results for finding methods that do not involve synchronization.

DETAILED DESCRIPTION OF THE PREFERRED EMBODIMENTS

Figures 9, 10A:
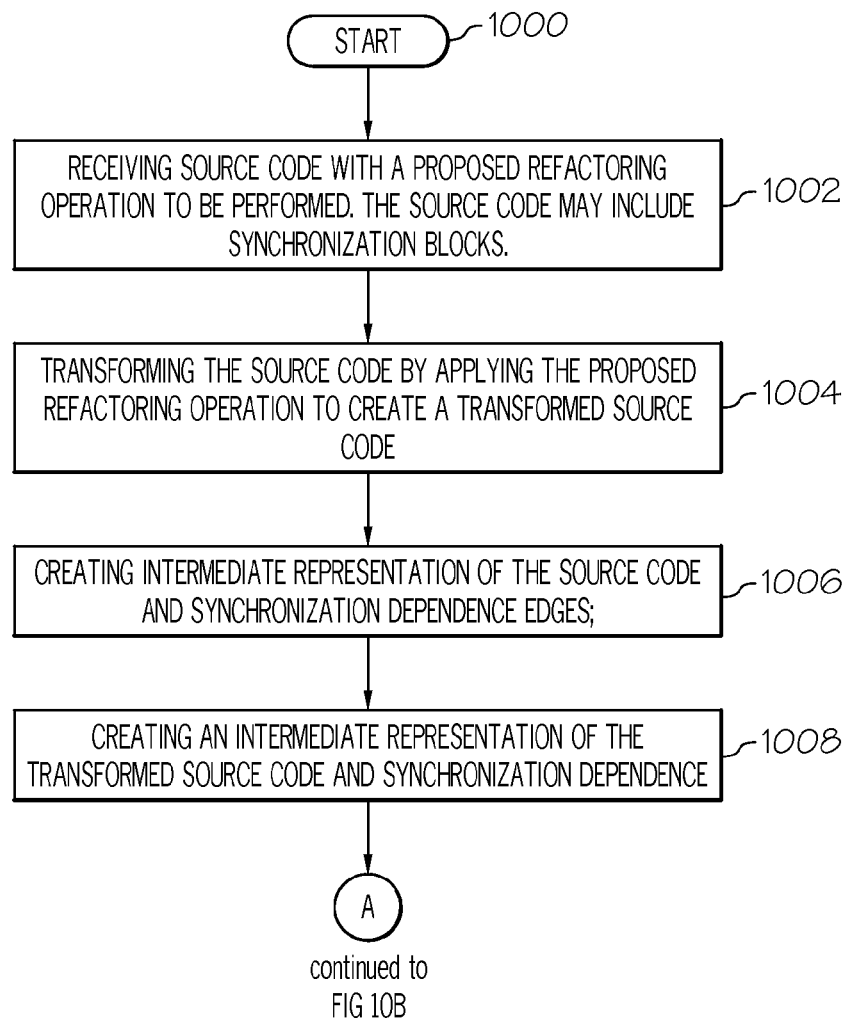
FIG. 9 illustrates a code sample for harness for executing two methods in parallel.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing like numerals refer to like parts through several views.

Overview of Approach

This invention presents a systematic approach to ensuring the correctness of commonly used refactorings on concurrent code. We propose to extend the concept of dependence edge preservation, previously used by Schäfer et al. to ensure correctness of refactorings on sequential code [28, 29], to the realm of concurrent programs. The newly introduced dependence edges relate language constructs significant to the underlying memory model, based on the reordering constraints it imposes. A refactoring implementation then builds on this framework and ensures that the appropriate edges are preserved under the transformation, which guarantees that certain behavior changes are not introduced.

Through use of our dependence edges in the specification of the memory model, we can formulate and prove precise behavior preservation results for refactorings that adopt them. For concurrent code, the notion of "behavior preservation" has to account for the non-deterministic behavior that can easily arise in concurrent settings. A refactored program preserves the behavior of the original one if all behaviors it can exhibit can also be exhibited by the original program, and vice versa. We investigate a number of commonly-used refactorings in terms of the Java Memory Model (JMM) [22] and show that the majority of them always preserve behavior in this sense, assuming they are behavior-preserving for sequential code. For some other important refactorings, we prove that they preserve the behavior of concurrent programs without data races when enhanced with our invention. Even for programs with races, the present invention does not to introduce any new races or deadlocks between actions from the original code (Further discussed below in the section entitled "Handing Programs with Races").

We have implemented our invention as an extension to an existing refactoring engine [28, 29] with very moderate effort. We show that the use of synchronization constructs that would impede refactoring is rare in real-world Java programs, hence the additional constraints imposed by our framework are unlikely to prevent common refactoring operations.

The contributions of our invention include:
- Illustrating that many existing refactoring implementations can introduce concurrency bugs related to altering possible inter-thread orderings (See the section entitled "Motivating Examples").
- Presenting the first comprehensive approach for avoiding such bugs in Java refactoring engines based on desugaring of the synchronized method qualifier and preserving synchronization dependence edges (Further discussed below in the section entitled "Techniques for Preserving Concurrent Behaviors").
- Applying the present invention to the Java memory model and prove that they yield a strong behavior preservation guarantee (See the section below entitled "Correctness of Refactorings In the Presences of Concurrency").
- Providing an implementation of our invention in an existing refactoring engine, showing that only moderate implementation effort is required to obtain behavior preservation for concurrent code (See the section below entitled "Implementation").

Finally, we discuss some related work in is discussed below in the section entitled "Related Work" followed by the section entitled "Conclusions".

Motivating Examples

In this section, a number of examples are presented where existing refactorings do not preserve program behavior in the presence of concurrency. The examples show that a variety of concurrency bugs may be introduced via existing refactorings, and that in some cases the introduced bugs are quite subtle, indicating the need for a principled approach to refactoring concurrent code.

Example Structure

Each example contains a class implementing an interface TM (for "Two Methods") with methods m1( ) and m2( ). A harness provided in the Section Below entitled "Execution Harness" executes m1( ) and m2( ) in parallel, exposing the concurrency bugs introduced by the refactorings. In all the example figures, part (a) shows the original program and part (b) shows the refactored program. The code targeted by the refactoring is highlighted in dark gray in part (a) of each figure, and code changed by the refactoring is highlighted in light gray in part (b).

Pull Up Members

The PULL UP MEMBERS refactoring [11] can introduce concurrency bugs when it mishandles the synchronized method qualifier. Consider the example program of FIG. 1(a). The program includes a class Super that declares two fields x and y. Subclass Sub of Super declares two static methods m( ), and n( ) that are respectively invoked by the methods m1( ) and m2( ), and hence may be run in parallel. Note that m( ) and n( ) are both synchronized, which implies that the code in the body of each method is protected by the same lock, Sub.class. (In Java, a static synchronized method is protected by a lock on the Class-object associated with the class in which the method is declared.) As a result, the updates to fields x and y by m( ) are executed atomically from method n( )'s point of view, and the print statement in n( ) can never execute.

Now suppose that the PULL UP MEMBERS refactoring is applied to move method Sub.m( ) into its superclass Super. We are not aware of any preconditions imposed on the PULL UP MEMBERS refactoring in the literature that would prevent this refactoring, and current IDEs such as Eclipse and IDEA allow it, producing the code of FIG. 1(b).

However, this transformation is not behavior-preserving: the synchronized method m( ) is now located in class Super, which means that it is now protected by the lock Super.class. Method n( ) is still protected by the lock Sub.class, and since these locks are different, the methods n( ) and m( ) can now be interleaved in arbitrary ways. In particular, n( ) may execute in between the field writes in m( ), leading to "bug" being printed, an impossibility in the original program.

Move Method

FIG. 2 gives an example where the Move Method refactoring can introduce a deadlock. In the original program, method m1( ) first acquires the B.class lock and then calls A.m( ), which in turn acquires the A.class lock (since it is synchronized). Method m2( ) acquires the A.class lock and then calls A.n( ), which again acquires lock A.class (this second lock-acquire trivially succeeds because Java monitors are reentrant). Deadlock is impossible in the original version of the program, because the only lock that is required by both threads, A.class, is never held indefinitely by either thread.

Now suppose that we apply the Move Method refactoring to move method n( ) from class A to class B, resulting in the code of FIG. 2(b). As with Pull Up Members, this refactoring is allowed by both the Eclipse and IDEA IDEs. However, the refactored program may deadlock. Moving the synchronized method A.n( ) to class B causes the method to synchronize on B.class. Hence, method m2( ) now first attempts to acquire lock A.class and then lock B.class. Since method m1( ) still attempts to acquire lock B.class and then lock A.class, we have the classic scenario where deadlock may occur due to a lack of a consistent locking order.

Extract Local

Here we show that the EXTRACT LOCAL refactoring can introduce an atomicity bug. For FIG. 3(a), consider applying Extract Local to the first read of the f field in method m1( ). The EXTRACT LOCAL refactoring as implemented in Eclipse and IDEA will introduce a new local variable (with a name interactively chosen by the programmer; we chose n in the example), initialize it to the selected expression, and replace all occurrences of that expression with a reference to the variable. (Eclipse replaces all occurrences by default, with an option to only extract the selected occurrence, whereas IDEA's default is to only extract the selected occurrence.) Since m1( ) contains another occurrence of the expression f, the refactoring produces the code shown in FIG. 3(b), declaring n outside the synchronized block.

Unfortunately, this transformation can change program behavior. Note that, in the original program, accesses to field f in methods m1( ) and m2( ) are protected by a lock on this. Consequently, the two increments of f in method m2( ) are performed atomically from the point of view of the references to f in m1( ), and hence m1( ) will only see even values in f. After the refactoring, the reference to f has been hoisted outside the synchronized blocks in m1( ). As a result, the reads of f in method m1( ) may occur between the two writes in m2( ), making it possible for m1( ) to print "bug" (an impossibility in the original program).

Inline Local

FIG. 4(a) shows an example program that relies only on two volatile fields a and b to synchronize between threads—the program does not contain any synchronized blocks or methods. In Java, a write of a volatile field by one thread guarantees that any other thread that subsequently reads this field sees all memory updates the former thread has performed, up to and including the volatile write. (In contrast, writes to non-volatile fields without other synchronization may appear to happen out-of-order from the perspective of other threads.) Thus a volatile field can be used as a flag by which one thread notifies another about the completion of a task or the availability of data.

The execution of the program in FIG. 4(a) takes place in the following order. First, the fields a and b are both initialized to false. Then, the thread executing m1( ) sets a to true and then spins until b becomes true. The only assignment to b is in the thread that executes method m2( ), meaning the spin loop in m1( ) will continue to be executed until the other thread executes this assignment. Meanwhile, the thread executing m2( ) begins by spinning until a becomes true, which happens when the other thread assigns true to a. At that point, b is set to true, and the thread terminates after printing "m2 finished". After b becomes true, the if-statement in m1( ) is executed and the thread terminates after printing "m1 finished". In summary, the execution of the actions by the two threads proceeds in a fixed order and always terminates normally. (The order in which the two print statements are executed is not constrained.)

FIG. 4(b) shows the example program after applying Inline Local to variable x. Note that refactoring has moved the write of the volatile field a after the spin-loop in method m1( ). This means that both threads are now executing their spin-loop until the other sets the volatile field used in its condition to true. Neither thread can make progress, resulting in a livelock, which was not possible in the original version of the program.

Convert Int to AtomicInteger

The CONCURRENCER tool of Dig et al. [7] provides refactorings aimed to help migrate code to the java.util.concurrent libraries introduced in Java 1.5. One such refactoring is CONVERT INT TO ATOMICINTEGER, which converts a field of type int and its accesses to the appropriate operations on an AtomicInteger. The transformation can improve both thread safety and scalability [7].

Surprisingly, in some corner cases it is possible for CONVERT INT TO ATOMICINTEGER to change program behavior. To explain how, we must introduce some terminology. The Java Memory Model relates reads, writes, and lock acquire and release events (among others) by the happens-before relation [20]. Informally, an operation a happens-before b, written a≤hb b, if (1) a is performed before b by the same thread, or (2) a≤hb r and q≤hb b, where r is a release of a lock that is later acquired by q. Given ≤hb, we can define a data race:

Definition 1. Two accesses to the same field or array element form a data race iff they are unrelated by ≤hb and at least one of them is a write.

Now, consider the program in FIG. 5(a). Notice in this program that either m1( ) or m2( ) will always print 0, due to the following reasoning. The placement of the synchronized blocks in m1( ) and m2 ( ) ensures that the program cannot have a data race on both x and y simultaneously. If m1( ) acquires and releases the this monitor before m2( ), then the read of x in m1( ) happens-before the write of x in m2( ), and therefore m1( ) must print 0. (In this case, there is no data race on x, but there may be a race on y.) By similar reasoning, if m2( ) synchronizes on this before m1( ), then m2( ) must print 0. Stated differently, FIG. 5 is an example showing how the Convert Int to AtomicInteger refactoring [7] may change program behavior. Here, the refactoring is applied to the z field.

Now suppose that the CONVERT INT TO ATOMICINTEGER refactoring is applied to the field z, yielding the program in FIG. 5(b). The refactoring removes the synchronized block from m2( ) and, with it, the happens-before edges between the operations on x and y. (While the getAndIncrement( ) method can be thought of as atomically performing a volatile read and a write of z, the atomicity and volatility of this operation do not induce any inter-thread happens-before edges because z is accessed only in m2( ).) That is, the refactored program, unlike the original one, may race on both x and y. According to the JMM, these races could cause the refactored program to print two 1's to the console, which was impossible in the original program.

This counter-intuitive outcome may be more easily understood in terms of the compiler transformations allowed by the JMM. In theory, a compiler could transform the m1( ) method from the refactored program in FIG. 5(b) to the following:

public void m1( ) {y=1; int r1=x; print(r1);}

In this scenario, the compiler removes the synchronized block from m1( ) after discovering that no other thread synchronizes on the same object. (This assumes the program is run with the harness as described in Appendix A.) Once the block is removed, the compiler can then reorder the read of x and the write of y, since they are independent accesses to different memory locations [16]. After these compiler transformations, there is an interleaving of the refactored program in which both m1( ) and m2( ) print 1.

No Java compiler performs the kind of global reasoning that is required for the transformations described above. As a result, we have not observed an execution of the program in FIG. 5(b) that prints two 1's to the console. In general, we suspect that this sort of bug is very unlikely to arise in practice for typical hardware and JVMs. Nonetheless, the example illustrates the difficulty of ensuring the correctness of refactorings with respect to the JMM, which allows various compiler and hardware optimizations that result in out-of-order reads and writes of shared memory.

Techniques for Preserving Concurrent Behaviors

The previous section showed that it is all too easy for a refactoring that rearranges or moves code to introduce concurrency bugs by enabling new interactions between parallel threads. Here, we describe two relatively simple techniques that can enable a refactoring engine to avoid introducing a wide variety of concurrency bugs, including all of those presented in the section below entitled "Motivating Examples." First, the section above below entitled "Handling Synchronized Methods" discusses that a simple desugaring of the synchronized method qualifier simplifies preserving its semantics during refactoring. Then, the section below entitled "Dependence Edges" describes how the approach of preserving dependence edges to ensure refactoring correctness [29] can easily be extended to prevent problematic reordering of concurrent code.

Handling Synchronized Methods

In the examples of FIGS. 1 and 2, a refactoring changed program behavior because moving a synchronized method to another class can result in the method acquiring a different lock when executed. One solution to this problem is to perform a desugaring step before refactoring that transforms a synchronized method into a method containing a synchronized block that explicitly refers to the appropriate lock. In FIG. 2 is an example showing how the Move refactoring may change program behavior. In this example, A.m( ) method is moved to class B. More specifically, the desugaring would transform the synchronized method A.n( ) of FIG. 2 into the following form:

static void n( ) {synchronized(A.class) { }}

In this form, the method can safely be moved to class B without changing program behavior. In the same vein, method Sub.m( ) from FIG. 1 would be desugared by introducing synchronization on Sub.class around its body, so it can be pulled.

up to class Super without further ado. After the refactoring, a "re-sugaring" step then tries to eliminate the introduced synchronized blocks in favor of synchronized qualifiers, which is, however, not possible in these two examples. The desugaring and resugaring steps are similar to the micro-refactorings advocated by Schäfer et al. [29], although interestingly here the focus is on simplifying the language to facilitate refactoring, whereas the latter work put its emphasis on enriching the language for the same purpose.

Dependence Edges

In past work [29], Schäfer et al. employed the concept of dependence edge preservation to rule out the possibility of behavior change for sequential refactorings. For example, the Inline Local refactoring, in its simplest form, takes a declaration T x=e; of a local variable, and replaces every reference to x with a copy of e. To ensure correctness, the refactoring engine computes all data and control dependencies of e, in particular all the reaching definitions of read accesses in e before and after the refactoring, and ensures that dependencies are neither acquired nor lost.

This approach is appealing since it enables us to apply well-understood concepts and techniques from the compiler construction literature in a refactoring context. For example, a framework for computing control flow graphs and determining data dependencies is part of many compiler frontends, and can perhaps be reused. This contrasts sharply with pre-condition-based approaches, where sufficient preconditions for behavior preservation have to be invented from scratch.

However, preserving data and control dependencies is not sufficient for concurrent code, as illustrated by the example in FIG. 4. There, the expression a=true has no (intraprocedural) control or data dependencies either before or after the refactoring, and yet the refactoring causes a behavior change due to interference with another thread. While in principle it might be possible to avoid this problem by adding inter-thread control and data dependencies, such an approach does not seem practical for real-world Java programs.

Looking more closely at the examples, we see that one of the main reasons for behavior change is the reordering of concurrency-related code by the refactoring. For example, in FIG. 3, a read of field f is moved out of a synchronized block, and in FIG. 4, a write and a read of two volatile fields are permuted; such reorderings enable new concurrent behaviors. We will now introduce synchronization dependencies, which capture this kind of constraint and will prevent such reorderings from happening. Stated differently, FIG. 3 illustrates how the Extract Local refactoring may change program behavior. Here, the first read of f in method m1( ) is extracted. FIG. 4 illustrates how the Inline Local refactoring may change program behavior. Here, the local x in m1( ) is inlined.

For example, an access to a field is synchronization dependent on every synchronized block in which it is nested or which precedes it, so it will lose a dependence when it is moved out of one of these blocks. Analogous to control and data dependencies, the refactoring engine will compute all synchronization dependencies of expressions it moves and checks that dependencies are preserved, thereby avoiding bugs like those in FIGS. 3 and 4.

Determining what synchronization dependencies must be modeled and how exactly they must be preserved requires consulting the memory model defining possible concurrent behaviors, in our case the JMM. While the detailed specification of the model is very technical, its main consequences in terms of permissible instruction reorderings are neatly summarized in Doug Lea's "JSR-133 Cookbook" [21], from which we take the matrix in FIG. 6 with JMM Reordering Matrix from [21]. The JMM classifies instructions into several categories, five of which figure in the reordering matrix:

1. A normal access is a read or write of a non-volatile shared memory location, i.e., a field that is not declared volatile, or an array element.
2. A volatile read is a read of, and a volatile write a write of, a field declared volatile. (Recall that Array elements cannot be declared volatile in Java.)
3. A monitor enter is an instruction that acquires a lock; it corresponds to the beginning of a synchronized block or method.
4. A monitor exit is an instruction that releases a lock; it corresponds to the end of a synchronized block or method.

An instruction from any of these categories that occurs in a particular execution of the program is called a (memory) action. Many other instructions, such as reads or writes of local variables or arithmetic operations, are not relevant to the memory model and do not give rise to actions.

The matrix specifies under which conditions an action can be reordered with an action that follows it in some execution. Each cell corresponds to a situation where an action of the kind indicated by the row label is followed (not necessarily immediately) by an action of the kind indicated by the column label. If the cell is labeled x, these two instructions cannot in general be reordered. (These restrictions are chosen from a pragmatic perspective, presupposing only moderate analysis capabilities, and hence are slightly conservative. For instance, a very sophisticated global analysis may be able to prove that a volatile field is only accessible from a single thread, and can hence be treated like a normal field [21]).

For example, the x in the first column of the second row indicates that a volatile read or monitor enter cannot be permuted with a subsequent normal access, which at source level would correspond to moving a normal access before a volatile read or out of a synchronized block. On the other hand, the blank cell in the upper left corner indicates that normal accesses can be reordered, provided that no other constraints such as data dependencies prohibit it.

FIG. 6 shows that as far as reordering is concerned, volatile reads behave the same as monitor enters, and volatile writes the same as monitor exits. The former two kinds of actions are collectively referred to as acquire actions, and the latter two as release actions. Both acquire actions and release actions are termed synchronization actions (but normal accesses are not). Hence, the matrix can be summarized by saying that (1) synchronization actions are not to be reordered; (2) a normal access cannot be moved past a release action; and (3) a normal access cannot be moved before an acquire action.

We define two kinds of synchronization dependencies in terms of the program's control flow graph:
  A CFG node b has an acquire dependence on a node a if a corresponds to an acquire action and there is a path from a to b in the CFG. We then say that there is an acquire edge between a and b.
  A CFG node a has a release dependence on a node b if b corresponds to a release action and there is a path from a to b in the CFG. We then say that there is a release edge between a and b.

In terms of these dependencies, FIG. 6 implies that during the reorderings performed by a refactoring,
  1. a normal access may never lose acquire dependencies,
  2. a normal access may never lose release dependencies,
  3. a node corresponding to a synchronization action may never gain acquire or release dependencies.

The matrix does not mention two other kinds of actions defined by the JMM: external actions and thread management actions. The former category comprises any action that interacts with the program's environment (such as input/output), whereas the latter represents the thread management methods from the Java standard library's Thread class. External actions do not require any special treatment. To ensure that no action is ever reordered with a thread management action, we introduce a third kind of synchronization dependence: a node a has a thread management dependence on any node b that corresponds to a thread management action and is reachable from it in the CFG. We require that
  4. a node corresponding to an action may never gain or lose a thread management dependence.

Synchronization dependencies are easy to compute once we have a control flow graph of the program to be refactored, in particular since they do not require any form of alias analysis. For example, a normal access has an acquire dependence on any preceding volatile read, no matter which field the read refers to.

In principle, any sequential refactoring can be made safe for concurrent programs as follows: (1) compute synchronization dependencies on the initial CFG, (2) perform the refactoring as in the sequential case, yielding an updated CFG, and (3) recompute synchronization dependencies on the updated CFG and ensure that they have been preserved as described above. An implementation of Extract Local updated in this way will reject the refactoring in FIG. 3 since f loses its acquire dependence on synchronized(this) { ... }, and an implementation of Inline Local will reject the refactoring in FIG. 4, since the volatile read of b gains a release dependence on the volatile write of a.

While the reordering matrix of FIG. 6 succinctly represents the implications of the JMM for code reorderings, some refactorings from our examples can do more than just reorder code. For example, the Extract Local refactoring is able to replace multiple identical expressions with the same new local, thereby possibly replacing multiple field accesses with one access (see FIG. 3). Similarly, applying Inline Local may duplicate an expression, thereby replacing one field access with many. The next section examines the implications of our dependence preservation framework more formally, proving a strong correctness guarantee even for some refactorings that go beyond code permutations.

Correctness of Refactorings in the Presence of Concurrency

In this section, we formalize the synchronization dependence preservation technique of discussed above in the section entitled "Dependence Edges" and show that for many refactorings, it yields a strong guarantee that the exact concurrent behaviors of input programs are preserved. In the section below entitled "Java Memory Model Basics" we give some background on the Java Memory Model, and in the section below entitled "Correctness Proofs" we present our formalization based on the memory model. Finally, the section below entitled "Handling Programs with Races" discusses our handling of programs with data races.

Java Memory Model Basics

Before formalizing our refactorings, we first describe some necessary concepts from the Java Memory Model [13, Chapter 17]. The JMM abstracts away from the concrete syntactic structure of programs, instead considering a program to be given as the (possibly infinite) set of its threads, and each thread as a set of memory traces representing possible executions. A memory trace is a list of actions (introduced in the section above entitled "Dependence Edges") paired up with their value, i.e., the value read or written by a normal or volatile access. These traces are required to obey intra-thread semantics in the sense that they correspond to executions of threads in isolation, except that reads of shared locations (fields or array elements) may yield arbitrary values to account for interaction between threads.

The set of memory traces for a thread is an overapproximation of the behavior it may actually exhibit when run in parallel with other threads. The JMM defines the notion of an execution, which chooses a particular trace for every thread and relates their actions in three ways. The first and simplest relation is the program order $\leq$po, which reflects the intra-thread ordering of actions, and is hence determined by the choice of traces. The program order never relates actions from different threads. Second, the execution defines a global total order $\leq$so on all synchronization actions in the traces, known as the synchronization order. For synchronization actions occurring within the same thread, this order has to be consistent with $\leq$po. Finally, the execution assigns to every read action r a corresponding write action W(r) on the same field or array element, requiring that the value seen by read r is the value written by write W(r).

Based on the program order $\leq$po and the synchronization order $\leq$so of an execution, two additional orders are defined. The synchronizes-with order $\leq$sw relates a release action r to an acquire action q if they correspond (i.e., either r is a write of a volatile field v which is read in q, or r exits a monitor m which q enters) and r$\leq$so q. The happens-before order $\leq$hb (described informally in the section above entitled "Motivating Examples") is defined as the transitive closure of $\leq$po$\cup$$\leq$sw. This means that a$\leq$hb b if either (1) a$\leq$po b, or (2) there is a release action r and an acquire action q such that a$\leq$po r$\leq$sw q$\leq$hb b. As in Defn. 1, a data race is then a pair of accesses to the same variable, at least one of which is a write, such that these accesses are not ordered by $\leq$hb.

Finally, the JMM defines a set of legal executions for a program, i.e., those behaviors that may actually occur when executing the program. To determine these legal executions, the JMM starts with well-behaved executions, which are executions in which every read r sees a most recent write W(r) to the same variable in the happens-before order. To derive a legal execution from a well-behaved execution, one then proceeds to commit data races, i.e., one decides whether a read sees a value through such a race or not. (This process can proceed one race at a time or can involve multiple races, and may even be restarted, although committed choices cannot be undone.) In a correctly synchronized program, i.e., a program with no data races, all legal executions are well-behaved, and the most recent write occurring before a given read is always uniquely defined. It is perhaps worth pointing out that correctly synchronized programs in this terminology are only required to be free of the low-level data races defined by the JMM. They may still contain higher-level races.

Correctness Proofs

The JMM deals with programs in a very abstract and low-level representation that is quite far removed from the Java source code a refactoring actually manipulates. Yet it is this high level of abstraction that allows us to easily establish our first correctness result:

Theorem 1. Any refactoring that is trace-preserving, i.e., does not alter the set of memory traces of a program, preserves the behavior of arbitrary concurrent programs: every possible behavior of the original program is a behavior of the refactored program and vice versa. This holds even in the presence of data races.

Proof. This is just a reformulation of a result in [16].

Perhaps surprisingly, a great many refactorings (and in particular the majority of all refactorings implemented in Eclipse) are trace-preserving, since many source-code constructs do not correspond to JMM actions. For example, the memory model has no concept of classes or methods, so refactorings that reorganize the program at this level are trace-preserving, among them PULL UP METHOD, PUSH UP METHOD, MOVE METHOD, and type-based refactorings such as INFER GENERIC TYPE ARGUMENTS. (This assumes the synchronized method qualifier is handled correctly; see the section above entitled "Handling SYNCHRONIZED Methods") The model does not deal with names either, so RENAME does not become any more complicated in a concurrent setting.

The JMM also does not model method calls (in a sense, method calls are always inlined in traces), so the refactorings Extract Method, Inline Method, and Encapsulate Field are all trace-preserving (again assuming correct handling of the synchronized keyword).

Two important refactorings that are not trace-preserving in general are Inline Local and Extract Local, since they may reorder field accesses. Note, however, that if these two refactorings are applied to expressions that do not involve field accesses or method calls (e.g., arithmetic expressions on local variables), they again become "invisible" to the memory model, and Theorem. 1 guarantees their correctness on all programs.

Thus the JMM concept of traces and memory actions gives us a convenient criterion to decide whether a refactoring is affected by concurrency at all.

For non-trace-preserving refactorings, we can pursue two directions: we can identify further subclasses of refactorings for which general results can be proved, or we can tackle the refactorings one by one to prove that their sequential implementation can be updated to preserve behavior on concurrent programs.

Exploring the former approach first, we note that among those refactorings that do in fact alter the set of memory traces a program yields, most do not actually remove any code from the refactored program (at least not code that corresponds to memory actions), but merely rearrange it. This might entail reordering statements or expressions, or merging pieces of code that do the same thing.

On the level of the JMM, we describe such transformations as follows:

Definition 2. A restructuring transformation is a partial function ρ on programs such that for every program P∈dom(ρ) and every execution E' of ρ(P) there is an execution E of P and a mapping f from actions in E to actions of the same kind in E'. Also, this mapping does not map actions belonging to the same thread in E to different threads in E'.

Intuitively, for every execution of the transformed program ρ(P) we can find a corresponding execution of the original program P. We do not require that this execution has the same behavior in any sense, but just that there is a mapping between their actions which shows that no actions of the old program have been lost, even though new actions may have been introduced.

Most importantly, however, the kinds of all actions need to be preserved. That means, in particular, that field accesses have to refer to the same fields and read or write the same values, and monitor operations have to handle the same locks.

Given this very liberal specification, it is impossible to prove that such a transformation preserves behavior. Instead, we will show that a restructuring transformation cannot introduce new data races or new deadlocks between existing actions if it respects the synchronization dependencies introduced in the previous section.

Definition 3. A restructuring transformation is said to respect synchronization dependencies if its mapping f fulfills the following three conditions for all actions a, b.
1. If a≤so b, then also f(a)≤'so f(b).
2. If a is an acquire action and a≤po b, then also f(a)≤'po f(b).
3. If b is a release action and a≤po b, then also f(a)≤'po f(b).

Since ≤so is a total order, the first requirement says that f cannot swap the order of synchronization actions, whereas the second and third requirements prohibit reordering normal accesses to appear before acquire actions or after release actions. Note that this is just a formalization of the synchronization dependencies introduced in the section above entitled "Dependence Edges" (For brevity, we mostly ignore thread management actions in this section, but all results can easily be extended to cover them as well.)

We first establish a slightly technical result.

Lemma 1. Let a synchronization dependence respecting restructuring be given and let a and b be actions. If a≤hb b, then either f(b)≤'hb f(a) or f(a)≤'hb f(b).

Proof. We first treat the case where a is an acquire action. In this case, we can actually prove that a hb b implies f(a)≤'hb f(b) by induction on hb: If a po b, then f(a)≤'po f(b), and hence f(a)≤'hb f(b), by Defn. 3. Otherwise we have a release action I and an acquire action q such that a≤poI≤swq≤hb b. As before, this means that f(a)≤'po f(I); since f preserves action kinds and so we have f(I) ≤'sw f(q), and finally f(q)≤'hb f(b) by induction hypothesis. Together this again shows f(a)≤'hb f(b).

Now consider the general case where a is not necessarily an acquire action. If a≤po b, then f(a)≤'po f(b) or f(b)≤'po f(a), since f does not map actions across threads. Otherwise, a≤po I≤sw q≤hb b for some release action I and an acquire action q. But by Defn.

3 this gives $f(a) \leq' po\ f(I)$. As above we see $f(I) \leq' sw\ f(q)$, and $f(q) \leq' hb\ f(b)$ follows since q is an acquire action. In summary, we get $f(a) \leq' hb\ f(b)$, establishing the claim.

Now our first result follows effortlessly:

Theorem 2. If there is a data race between two actions f(a) and f(b) in execution E', then there is already a data race between a and b in E.

Proof. Follows directly from the previous lemma and the definition of a data race.

This result ensures that a synchronization respecting restructuring can never introduce a new data race between two actions carried over from the original program, although there may well be a data race involving actions introduced by the transformation.

We immediately gain an important corollary:

Corollary 1. A restructuring transformation that does not introduce any new actions will map correctly synchronized (i.e., data race free) programs to correctly synchronized programs.

A similar result can be established for deadlocks.

Lemma 2. If there is a deadlock in an execution E' of $\rho(P)$ caused by locking actions in rng(f), then the same deadlock occurs in E.

Proof. We sketch the proof for the case of two deadlocking threads. In that case, there are threads $\theta$ and $\theta'$ and monitor enter actions $I_1$, $I'_1$, $I_2$, $I'_2$. Writing $L(I_1)$ for the lock acquired by action $I_1$ and similarly for the others, we require $L(I_1)=L(I'_1)$ and $L(I_2)=L(I'_2)$; actions $I_1$ and $I_2$ belong to $\theta$, whereas $I'_1$ and $I'_2$ belong to $\theta_1$. By the definition of f, the same must be true of $f(I_1)$, $f(I'_1)$, $f(I_2)$, $f(I'_2)$. In order for $\theta$ and $\theta_1$ to deadlock, we must have $f(I_1) \leq po\ f(I_2)$, $f(I'_2) \leq po\ f(I'_1)$, $f(I_1) \leq so\ f(I'_1)$, and $f(I'_2) \leq so\ f(I_2)$. By definition of f, the same is true of $I_1$, $I'_1$1, $I_2$, $I'_2$ due to the totality of $\leq so$ over all synchronization actions, the fact that $\leq po$ and $\leq so$ are consistent, and the first point of Def. 3.

Again, this proves that the transformation cannot introduce a deadlock only involving actions from the original program, but does not preclude the existence of deadlocks involving newly introduced actions. The above two results establish a certain baseline. They apply to a wide range of refactorings (and indeed non-behavior-preserving transformations), but only guarantee very basic properties.

We conclude this section by establishing the correctness of two very important refactorings on correctly synchronized programs (See programs with races in the section below entitled "handling Programs with Races."):

Theorem 3. The refactorings EXTRACT LOCAL and INLINE LOCAL preserve the behavior of correctly synchronized programs if they preserve the behavior of sequential programs and respect synchronization dependencies.

Proof (Outline). For EXTRACT LOCAL, note that if we extract copies $e_1, \ldots, e_n$ of an expression e into a local variable, there cannot be any acquire or thread management actions between the individual copies, since the refactoring needs to preserve synchronization dependencies. In a well-behaved execution this means that the read actions in all copies see the same values, hence correctness for sequential programs ensures behavior preservation.

For INLINE LOCAL, the refactoring may move field reads over acquire actions, which would seem to make it possible for them to see values written by different field writes than before the refactoring. For correctly synchronized programs, however, this is not possible, since the read must already have been preceded by corresponding acquire actions in the original program to prevent data races. So again read actions will see the same values as in the original program, and sequential correctness ensures behavior preservation.

The above argument can be made somewhat more precise, but a rigorous proof would need a formalization of the correspondence between source-level Java programs and programs as they are viewed by the JMM. Such an undertaking is beyond the scope of this work, so we content ourselves with this intuitive argument.

Apart from pragmatic considerations described in the following subsection, there are some technical details of the JMM specification that make it unlikely that the above correctness result can be extended to hold on programs with data races. Concretely, our definition of dependence edges allows INLINE LOCAL to perform a so-called roach motel reordering, by which an access is moved inside a synchronized block [22], and EXTRACT LOCAL to perform a redundant read elimination. While the authors of the JMM originally claimed that these transformations are formally behavior-preserving [22], later research has shown that this is not the case [5, 16]. Arguably this indicates a fault with the specification of the JMM, but it remains an open problem whether the model can be changed to accommodate these and similar transformations.

Handling Programs with Races

Theorem 3 only states that EXTRACT LOCAL and INLINE LOCAL are correct for programs without data races. For programs with data races, it is possible for these refactorings to remove or introduce concurrent behaviors. For example, consider FIG. 7, where INLINE LOCAL is applied to tmp in m1( ). If m1( ) and m2( ) can run concurrently, there is a possible data race on the x field. In the original program, m1( ) can assign either 0 or 2 to field y, depending on when m2( ) executes. In the modified program, x is read twice, enabling the new behavior of m1( ) assigning 1.

It is impractical to require refactorings to preserve the concurrent behaviors of programs with races while still enabling standard transformations. Note that the refactoring in FIG. 7 is behavior-preserving if the program is sequential; hence, its correctness depends on whether m1( ) and m2( ) can execute in parallel. Unfortunately, for Java programs, determining what code can execute in parallel requires expensive whole-program analysis [24], and may even be impossible when refactoring library code with unknown clients. Hence, to enable standard refactorings on sequential code to proceed (the common case), we allow refactorings like that of FIG. 7 even when programs may have data races. Stated differently, FIG. 7 illustrates Inline Local applied to tmp in m1( ) in the presence of a possible data race.

We expect that issues involving refactorings and data races will arise very rarely in practice. Java best practices generally discourage the use of data races, and hence most races encountered in practice are likely to be unintentional. A similar situation arises with the practice of ignoring Java reflection in refactoring engines—while in principle the use of reflection could cause many refactorings to be incorrect, in practice it rarely causes a problem.

Implementation

In this section, we describe our experience implementing the present invention described in the section above entitled "Techniques for Preserving Concurrent Behaviors" for correctly refactoring concurrent code. We first present an implementation that is purely intraprocedural, handling procedure calls pessimistically. Then, we discuss a technique that handles procedure calls more precisely while remaining amenable to implementation in a refactoring tool.

Intraprocedural Implementation

Our intraprocedural implementation operates on a control-flow graph, as described in the section above entitled "Dependence Edges". In addition to the dependencies described earlier, method calls are handled conservatively by treating them as thread management actions, preventing any reordering across them. To approximate calling contexts, the start node of every method also counts as an acquire action, and the end node as a release action. Recall that this dependence computation is only required for refactorings like INLINE LOCAL and EXTRACT LOCAL that alter memory traces; the many refactorings that do not affect memory traces require no changes (see Theorem 1).

We implemented the computation of synchronization dependence edges using the control flow analysis of Nilsson-Nyman et al. [25]. Their analysis is implemented in the attribute grammar system JastAdd [10] as an extension of the JastAddJ Java compiler [9]. These new dependence edges were then integrated into the refactoring engine developed by the first author [28, 29], which is likewise based on JastAddJ. Since that engine already used dependence edges to ensure preservation of control and data flow dependencies, we simply introduced three new kinds of edges (acquire, release, and thread management dependence edges) and implemented the checks to ensure their preservation. In particular, we extended the implementations of EXTRACT LOCAL and INLINE LOCAL to preserve synchronization dependencies, and we ensured that they correctly identify the problematic examples presented earlier in this invention, while passing all existing regression tests [29]. (Note that our implementation of EXTRACT LOCAL does not do any clone detection, and hence only ever extracts a single copy of an expression.)

To ensure correct handling of the synchronized keyword, we implemented the desugaring step described in the section above entitled "Handling SYNCHRONIZED Methods" that replaces synchronized qualifiers with synchronized blocks before the refactoring, and performs the reverse transformation afterwards where possible. The existing name binding machinery in the refactoring engine then ensures that synchronized blocks are handled correctly.

The amount of code required to add the above features was quite modest. The analysis for computing synchronization dependence edges was implemented in about 70 lines of JastAdd, and the sugaring/desugaring of synchronized in less than 50 lines. Updating existing refactorings to make use of these new techniques was a matter of adding only two lines of code.

Better Handling of Procedure Calls

The main limitation of the intraprocedural implementation is its coarse treatment of method calls, which in particular prevents extracting and inlining most expressions involving such calls. Fortunately, we found that a simple and practical analysis could prove that 70-90% of calls have no synchronization dependencies in practice, enabling many more refactorings to proceed.

Note that procedure calls already present a significant challenge for refactoring tools in the case of sequential code, due to unknown data dependencies, possible side effects, etc. Detecting these effects can be very expensive, as it requires a precise call graph and reasoning about pointer aliasing. The real-world refactoring engines we are aware of currently do not even attempt to detect these issues, leaving reasoning about the correctness of refactoring procedure calls to the user. In what follows, we concentrate solely on how to analyze procedure calls to determine synchronization dependencies; to preserve behavior, a refactoring tool would have to combine this analysis with other techniques to handle issues pertinent to sequential code.

To construct synchronization dependence edges for method calls, we must know if the invoked method may perform monitor operations, accesses to volatile fields, or thread management operations. Given the relative rarity of such operations, one would expect that an analysis with a very coarse call graph could still provide much better information than the pessimistic approach described before. More precisely, we want to find out how many methods in a typical Java program involve synchronization, where we say that a method m involves synchronization if 1. m is declared synchronized or contains a synchronized block, or
2. m contains an access to a volatile field, or
3. m calls a thread management method from the standard library, or
4. m calls a method m' which involves synchronization.

We implemented a simple stand-alone analysis in WALA [33] that examines all methods in a given program to see whether they involve synchronization. To make the analysis cheap, the call graph used is based solely on a class hierarchy (required by many refactorings) and declared types of variables, and the call graph of any method is pruned to 200 methods. If a method has more than 200 transitive callees, we conservatively assume that it involves synchronization.

We ran this analysis on the DaCapo 2006-10-MR2 benchmarks [3] and Apache Ant1.7.1 [1], another large Java program. (The lusearch benchmark is excluded from the table since the results were identical to luindex.) For each benchmark, shown in FIG. 8 is a table, Table 1, gives the total number of methods examined, the number of methods that may involve synchronization, the number of methods proved not to involve synchronization, and the number of methods for which the analysis exceeded the threshold. The last two columns give the mean number of callees that need to be analyzed per method and the percentage of methods proved to not involve synchronization. Stated differently, FIG. 8 has analysis results for finding methods that do not involve synchronization.

In summary, the results show that a simple and cheap analysis can establish for 70-90% of methods in real world programs that they never involve synchronization, and hence cannot give rise to synchronization dependence edges. The analysis does not require a precise call graph, and the work it does can easily be bounded, thus it is certainly feasible to integrate such an analysis into a refactoring engine. (The analysis as described here does not consider native methods. A conservative handling could always treat native methods as thread management actions that prohibit reordering; we verified that this treatment does not significantly impact the numbers in Table 1. For the Java standard library, the API documentation provides more precise information about what synchronization actions a native method entails.)

Note also that for code that does not involve synchronization, tracking synchronization dependencies does not change the behavior of a refactoring tool; hence, these data indicate that refactoring tools enhanced with our techniques will behave as before for most code.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 10B:
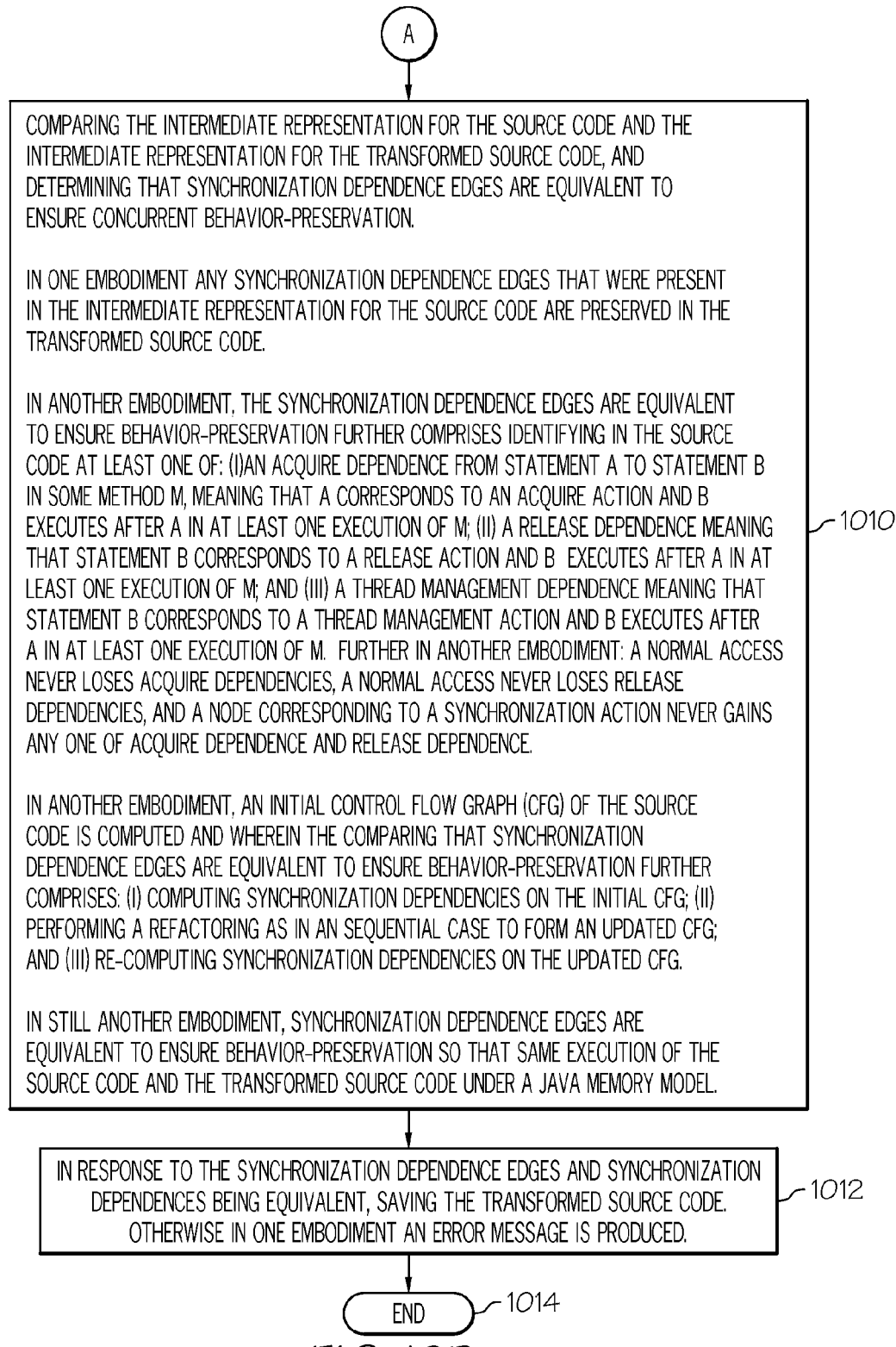
FIG. 10 is a high level flow diagram of the invention being implemented using the example computing hardware of FIG. 11.
Figure 11:
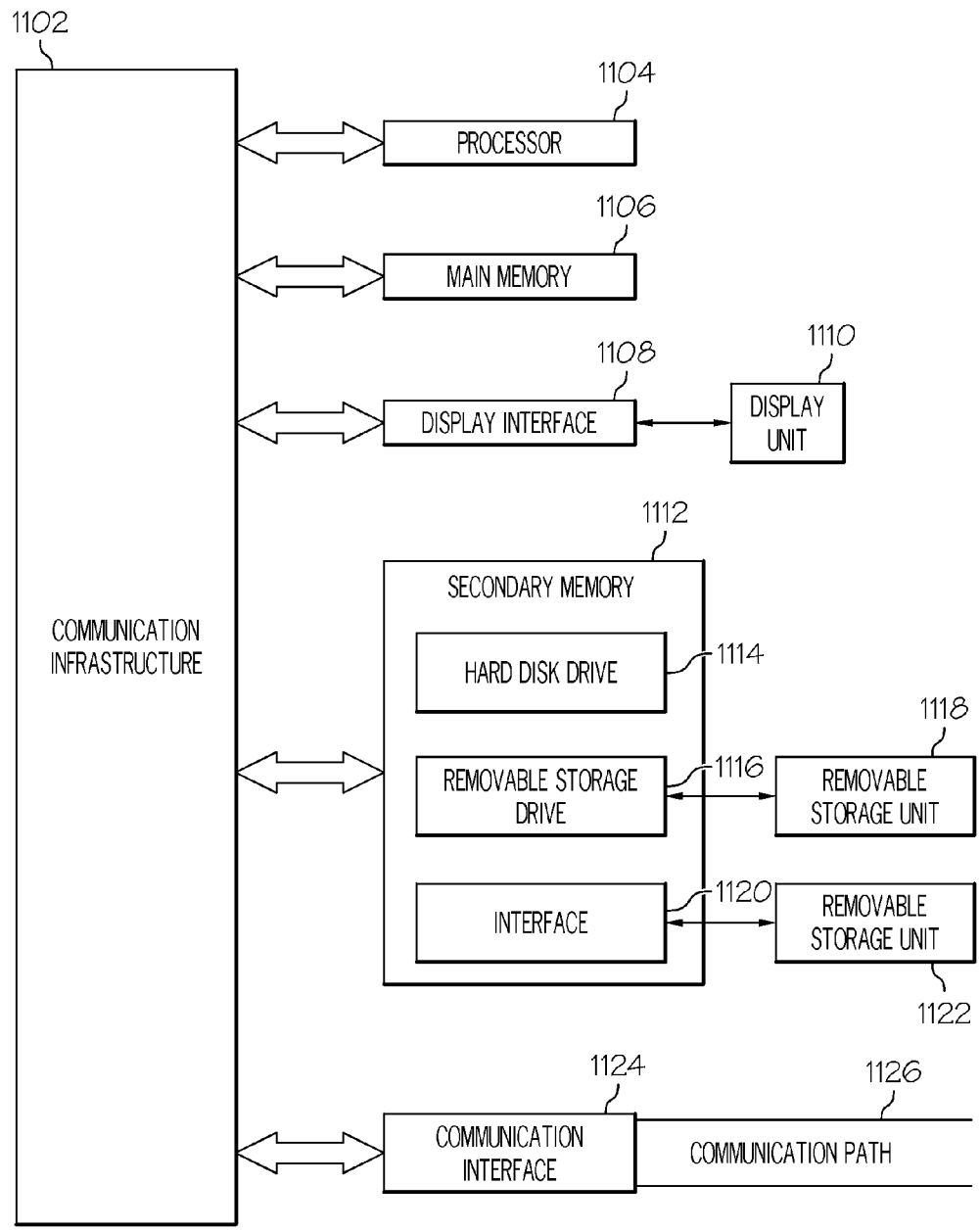
FIG. 11 is a block diagram of a computer system useful for implementing the software steps of the present invention.

FIG. 10 is a high level flow diagram of the method for behavior-preserving transformation of a concurrent program invention being implemented using the example computing hardware of FIG. 11. The process begins are step 1000 and immediately proceeds to step 1002 where source code is received with a proposed refactoring operation to be performed. The source code may include synchronization blocks as part of the concurrent program. Next in step 1004, the source code is transformed by applying the proposed refactoring operation to create a transformed source code. An intermediate representation of the source code including synchronization dependence edges is created in step 1006. Followed by step 1008 where an intermediate representation of the transformed source code including synchronization dependence edges is created. The intermediate representation for the source code and the intermediate representation for the transformed source code is compared in step 1010. This comparison is used to determine if synchronization dependence edges are equivalent to ensure concurrent behavior-preservation. Depending on the results of step 1010, the transformed source code is saved or an error is produced in step 1012 and the process flows ends in step 1014.

In one embodiment any synchronization dependence edges that were present in the intermediate representation for the source code are preserved in the transformed source code.

In another embodiment, in the source code the following is identified: (i) an acquire dependence from statement A to statement B in some method M, meaning that A corresponds to an acquire action and B executes after A in at least one execution of M. The acquired dependence in one embodiment means a node a corresponds to an acquire action and there is a path from the node a to a node b in a control flow graph (CFG) that has been computed for the source code; (ii) a release dependence meaning that statement B corresponds to a release action and B executes after A in at least one execution of M. The release dependence in one embodiment means the node b corresponds to a release action and there is a path from the node a to the node b in the CFG; and (iii) a thread management dependence meaning that statement B corresponds to a thread management action and B executes after A in at least one execution of M. The thread management dependence in one embodiment means any node b that corresponds to a thread management action and is reachable from node b in the CFG.

These types of dependence identified to ensure behavior-preservations include: (i) a normal access never loses acquire dependencies; (ii) a normal access never loses release dependencies, and (iii) a node corresponding to a synchronization action never gains any one of acquire dependence and release dependence.

In another embodiment, an initial control flow graph (CFG) of the source code is computed and wherein the comparing that synchronization dependence edges are equivalent to ensure behavior-preservation further comprises: (i) computing synchronization dependencies on the initial CFG; (ii) performing a refactoring as when applied to a sequential program to form an updated CFG; and (iii) re-computing synchronization dependencies on the updated CFG.

In still another embodiment, synchronization dependence edges are equivalent to ensure behavior-preservation so that same execution of the source code and the transformed source code under a java memory model Related Work Correctness of Refactorings Correctness of refactorings has long been a primary concern in the literature. Opdyke [26] champions a pre- and post-condition based approach, specifying global conditions a program has to meet for the refactoring to be correct. Griswold [14] views refactorings in terms of their effects on the program dependence graph, which gives rise to a treatment of refactoring correctness in terms of the preservation of dependencies as espoused in earlier work by the first author and colleagues [28, 29].

Tip et al. [31, 32] developed an approach based on type constraints to reason about the correctness of refactorings related to generalization such as EXTRACT INTERFACE. This work was later extended to support refactorings that introduce generics [12, 18], and a refactoring that assists programmers with the transition from legacy classes to functionally equivalent ones that replace them [2].

In recent work by Steimann and Thies [30], the correctness of refactorings in the face of access modifiers such as public and private is considered. Like our work, Steimann is concerned with situations where the application of existing refactorings such as MOVE CLASS unexpectedly change a program's behavior without appropriate changes to access modifiers. To avoid such problems, Steimann et al. propose a constraint-based approach similar in spirit to that of [31, 32].

All the above approaches explicitly or implicitly restrict their attention to sequential programs. Other publications dealing with concurrency related issues, like [17], usually strengthen their preconditions to prevent refactoring code that looks like it might be run in a concurrent setting.

Java Compilers

Java compilers are generally very cautious about optimizing concurrent code. While we could not find any published work on the optimizations performed by recent systems, it appears that previous versions of the Jikes virtual machine's just-in-time compiler utilized a notion of synchronization dependence edges not unlike the one we use in this invention to prevent code motion of memory operations across synchronization points [4]. Their dependencies would appear to be more restrictive than ours (forbidding, for instance, roach motel reordering), and they are based on the pre-Java 5 memory model. Also recall that for practicality, we allow some non-behavior-preserving transformations for programs with data races (see the section above entitled "Handling Programs with Races"), which clearly must be disallowed in a compiler.

Dependencies for Concurrent Programs

There has been some work in the slicing community on slicing concurrent programs. For this purpose, several authors have proposed new dependencies to complement the classic control and data dependencies in analyzing concurrent programs. Cheng [6] proposes three new kinds of dependencies: selection dependence to model control dependencies arising from non-deterministic selection, synchronization dependence to model synchronization between processes, and communication dependence to model inter-process communication. (Despite the name, this is a very different concept from the synchronization dependencies introduced in this work.)

Krinke [19] instead introduces interference dependencies that model the interaction between threads due to the use of shared variables; no synchronization constructs are considered. In particular, it seems that such dependencies would have to take data races and all their possible outcomes into account, which would make them unsuitable for our purposes. Both authors treat the problem at a fairly abstract level. Zhao [35] considers the problem of computing the dependencies proposed by Cheng for Java programs. His approach does not seem to be directly based on the pre-Java 5 memory model, though, and in particular does not handle volatile accesses.

Refactoring and Concurrency

Recently, there has been a lot of interest in refactorings that are specifically designed to enhance concurrency in programs. The REENTRANCER tool transforms programs to be reentrant, enabling safe parallel execution [34]. The CONCURRENCER tool of Dig et al. [7] (discussed in the section above entitled "Motivating Examples") aims to adapt sequential Java code to use concurrent libraries, and the RELOOPER tool [8] reorganizes loops to execute in parallel. Note that while our techniques would prevent the potentially problematic CONCURRENCER transformation described in the section above entitled "Motivating Examples", devising conditions under which such a transformation is safe under the JMM remains as future work. Finally, several researchers have tackled the problem of implementing refactorings for X10, a Java-based language with sophisticated concurrency support, and have reported promising first results [23].

Conclusions

We have investigated the problem of how to make existing sequential refactoring implementations concurrency-aware so that they do not change the behavior of concurrent code. We have shown examples of how some basic refactorings can break concurrent programs, even if they work correctly for sequential code. Some problems can be solved simply by improving the handling of concurrency-related language constructs such as the synchronized keyword. A more subtle problem is the reordering of memory actions by refactorings, which calls for a principled solution.

We have tackled this problem by introducing synchronization dependencies that model certain ordering constraints imposed by the memory model. A refactoring has to respect these edges in the same way it has to respect control and data dependencies, so as to avoid problematic code reordering that could change the behavior.

We have related these dependencies to the specification of the Java memory model, and proved that respecting them makes some key refactorings behavior preserving on correctly synchronized programs. For a very broad class of transformations we can also prove that they do not inadvertently introduce new data races or deadlocks. But perhaps the most reassuring result is that the majority of refactorings do not even need any special treatment to work on concurrent programs.

This work has laid the foundations on adapting basic refactorings to a concurrent setting. While our discussion has been focused on Java and its current memory model, adapting the techniques to other high-level languages, such as C#, and their memory models [15] should be straightforward, as they are based on similar concepts.

One possible area of future work would be to consider more complex refactorings that do more than just moving code around. For instance, some advanced refactorings like CONVERT LOCAL VARIABLE TO FIELD introduce new shared state, which is challenging to handle correctly in a concurrent environment. While synchronization dependencies alone are not enough to solve this kind of problem, the concepts and techniques developed in this work can hopefully serve as a basis for addressing these new challenges.

Non-Limiting Hardware Embodiments

Execution Harness

The examples presented in the section above entitled "Motivating Examples" can all be executed in a common harness for executing two methods in parallel as shown in FIG. 9. The method Harness.runInParallel( ) takes an argument of interface type TM, which defines methods m1( ) and m2( ). To use the harness, the programmer must (i) create a subtype T of TM that provides methods m1( ) and m2( ) and (ii) invode runInParallel( ) with an instance t of T, resulting in the concurrent execution of t.m1( ) and t.m2( ). For instance, the example of FIG. 1 could be run by calling Harness.runInParallel(new C1( ).

Hardware and Software Implementations

Overall, the present invention can be realized in hardware or a combination of hardware and software. The processing system according to a preferred embodiment of the present invention can be realized in a centralized fashion in one computer system, or in a distributed fashion where different elements are spread across several interconnected computer systems and image acquisition sub-systems. Any kind of computer system—or other apparatus adapted for carrying out the methods described herein—is suited. A typical combination of hardware and software is a general-purpose computer system with a computer program that, when loaded and executed, controls the computer system such that it carries out the methods described herein.

An embodiment of the processing portion of the present invention can also be embedded in a computer program product, which comprises all the features enabling the implementation of the methods described herein, and which—when loaded in a computer system—is able to carry out these methods. Computer program means or computer programs in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system to read data, instructions, messages or message packets, and other computer readable information from the computer readable medium. The computer readable medium may include non-volatile memory, such as ROM, flash memory, disk drive memory, CD-ROM, and other permanent storage. Additionally, a computer readable medium may include, for example, volatile storage such as RAM, buffers, cache memory, and network circuits.

An example of a computer system 1100 is shown in FIG. 11. The computer system 1100 includes one or more processors, such as processor 1104. The processor 1104 is connected to a communication infrastructure 1102 such as a communications bus, crossover bar, or network. Various software embodiments are described in terms of this exemplary computer system. After reading this description, it will become apparent to a person of ordinary skill in the relevant art(s) how to implement the invention using other computer systems and/or computer architectures.

Computer system 1100 includes a display interface 1108 that forwards graphics, text, and other data from the communication infrastructure 1102 (or from a frame buffer not shown) for display on the display unit 1110. Computer system 1100 also includes a main memory 1106, preferably random access memory (RAM), and optionally includes a secondary memory 1112. The secondary memory 1112 includes, for example, a hard disk drive 1114 and/or a removable storage drive 1116, representing a floppy disk drive, a magnetic tape drive, an optical disk drive, etc. The removable storage drive 1116 reads from and/or writes to a removable storage unit 1118 in a manner well known to those having ordinary skill in the art. Removable storage unit 1118, represents a floppy disk, magnetic tape, optical disk, etc. which is read by and written to by removable storage drive 1116. As will be appreciated, the removable storage unit 1118 includes a computer usable storage medium having stored therein computer software and/or data.

In alternative embodiments, the secondary memory 1112 includes other similar means for allowing computer programs or other instructions to be loaded into computer system 1100. Such means include, for example, a removable storage unit 1122 and an interface 1120. Examples of such include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 700.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

BIBLIOGRAPHY

Each of the references cited herein are each individually incorporated by reference hereinto in their entirety.

[1] Apache Ant. http://ant.apache.org.
[2] I. Balaban, F. Tip, and R. Fuhrer. Refactoring support for class library migration. In OOPSLA, pages 265-279, 2005.
[3] S. M. Blackburn, R. Garner, C. Hoffman, A. M. Khan, K. S. McKinley, R. Bentzur, A. Diwan, D. Feinberg, D. Frampton, S. Z. Guyer, M. Hirzel, A. Hosking, M. Jump, H. Lee, J. E. B. Moss, A. Phansalkar, D. Stefanović, T. VanDrunen, D. von Dincklage,
and B. Wiedermann. The DaCapo benchmarks: Java benchmarking development and analysis. In OOPSLA, 2006.
[4] M. G. Burke, J.-D. Choi, S. Fink, D. Grove, M. Hind, V. Sarkar, M. J. Serrano, V. C. Sreedhar, H. Srinivasan, and J. Whaley. The Jalapeño dynamic optimizing compiler for Java. In JAVA '99, pages 129-141, 1999.
[5] P. Cenciarelli, A. Knapp, and E. Sibilio. The Java Memory Model: Operationally, Denotationally, Axiomatically. In ESOP, pages 331-346, 2007.
[6] J. Cheng. Slicing Concurrent Programs: A Graph-Theoretical Approach. In Automated and Algorithmic Debugging. Springer-Verlag, 1993.
[7] D. Dig, J. Marrero, and M. D. Ernst. Refactoring sequential Java code for concurrency via concurrent libraries. In ICSE, pages 397-407, 2009.
[8] D. Dig, M. Tarce, C. Radoi, M. Minea, and R. Johnson. ReLooper: Refactoring for Loop Parallelism in Java. In OOPSLA Companion, 2009.
[9] T. Ekman and G. Hedin. The JastAdd Extensible Java Compiler. SIGPLAN Notices, 42(10):1-18, 2007.
[10] T. Ekman and G. Hedin. The JastAdd system—modular extensible compiler construction. Science of Computer Programming, 69(1-3):14-26, 2007.
[11] M. Fowler. Refactoring. Improving the Design of Existing Code. Addison-Wesley, 1999.
[12] R. Fuhrer, F. Tip, A. Kieżun, J. Dolby, and M. Keller. Efficiently refactoring Java applications to use generic libraries. In ECOOP, 2005.
[13] J. Gosling, B. Joy, G. Steele, and G. Bracha. The Java Language Specification. Prentice Hall, 3rd edition, 2005.
[14] W. G. Griswold. Program Restructuring as an Aid to Software Maintenance. Ph.D. thesis, University of Washington, 1991.
[15] T. Q. Huynh and A. Roychoudhury. A memory model sensitive checker for C#. In FM, volume 4085 of LNCS, pages 476-491, 2006.
[16] Jaroslav Ševčík and David Aspinall. On Validity of Program Transformations in the Java Memory Model. In J. Vitek, editor, ECOOP, 2008.
[17] H. Kegel and F. Steimann. Systematically Refactoring Inheritance to Delegation in Java. In ICSE, pages 431-440, 2008.
[18] A. Kieżun, M. Ernst, F. Tip, and R. Fuhrer. Refactoring for parameterizing Java classes. In ICSE, pages 437-446, 2007.
[19] J. Krinke. Static Slicing of Threaded Programs. SIGPLAN Not., 33(7), 1998.
[20] L. Lamport. Time, clocks, and the ordering of events in a distributed system. Commun. ACM, 21(7):558-565, 1978.
[21] D. Lea. The JSR-133 Cookbook for Compiler Writers, 2008. http://gee.cs.oswego.edu/dl/jmm/cookbook.html.
[22] J. Manson, W. Pugh, and S. V. Adve. The Java Memory Model. In POPL, pages 378-391, New York, N.Y., USA, 2005. ACM.
[23] S. Markstrum, R. M. Fuhrer, and T. D. Millstein. Towards concurrency refactoring for X10. In PPOPP, pages 303-304, 2009.
[24] M. Naik and A. Aiken. Conditional must not aliasing for static race detection. In POPL, New York, N.Y., USA, 2007. ACM.
[25] E. Nilsson-Nyman, T. Ekman, G. Hedin, and E. Magnusson. Declarative Intraprocedural Flow Analysis of Java Source Code. In LDTA, 2008.
[26] W. F. Opdyke. Refactoring Object-Oriented Frameworks. PhD thesis, University Of Illinois at Urbana-Champaign, 1992.
[27] D. Roberts and J. Brant. Refactoring Tools. In Martin Fowler, editor, Refactoring, pages 401-407. 1999.
[28] M. Schäfer, T. Ekman, and O. de Moor. Sound and Extensible Renaming for Java. In G. Kiczales, editor, OOPSLA. ACM Press, 2008.
[29] M. Schäfer, M. Verbaere, T. Ekman, and O. de Moor. Stepping Stones over the Refactoring Rubicon—Lightweight Language Extensions to Easily Realise Refactorings. In S. Drossopoulou, editor, ECOOP, 2009.
[30] F. Steimann and A. Thies. From Public to Private to Absent: Refactoring Java Programs under Constrained Accessibility. In ECOOP, 2009.
[31] F. Tip. Refactoring using type constraints. In SAS, 2007.
[32] F. Tip, A. Kieżun, and D. Bäumer. Refactoring for generalization using type constraints. In OOPSLA, pages 13-26, 2003.
[33] T. J. Watson Libraries for Analysis (WALA). http://wala.sf.net.
[34] J. Wloka, M. Sridharan, and F. Tip. Refactoring for Reentrancy. In ESEC/FSE, 2009.

[35] J. Zhao. Multithreaded Dependence Graphs for Concurrent Java Program. Int. Symp. on Softw. Eng. for Parallel and Distr. Syst., 1999.

What is claimed is:

1. A computer-implemented method for behavior-preserving transformation of a concurrent program, the method comprising:
   receiving source code with a proposed refactoring operation to be performed;
   transforming the source code by applying the proposed refactoring operation to create a transformed source code;
   creating an intermediate representation of the source code including synchronization dependence edges between two specific elements of the source code;
   creating an intermediate representation of the transformed source code including synchronization dependence edges;
   comparing the intermediate representation for the source code and the intermediate representation for the transformed source code, and determining that synchronization dependence edges are equivalent to ensure concurrent behavior-preservation; and
   in response to the synchronization dependence edges and synchronization dependences being equivalent, saving the transformed source code.

2. The method of claim 1, wherein the comparing that synchronization dependence edges are equivalent to ensure behavior-preservation includes that checking synchronization dependence edges that were present in the intermediate representation for the source code are preserved in the transformed source code.

3. The method of claim 1, wherein the source code includes synchronized blocks.

4. The method of claim 1, wherein the comparing the synchronization dependence edges are equivalent to ensure behavior-preservation further comprises identifying in the source code at least one of:
   an acquire dependence from statement A to statement B in some method M, meaning that A corresponds to an acquire action and B executes after A in at least one execution of M;
   a release dependence from statement A to statement B in some method M, meaning that statement B corresponds to a release action and B executes after A in at least one execution of M; and
   a thread management dependence from statement A to statement B in some method M, meaning that statement B corresponds to a thread management action and B executes after A in at least one execution of M.

5. The method of claim 1, wherein the comparing that synchronization dependence edges are equivalent to ensure behavior-preservation further comprises ensuring that:
   a normal access never loses acquire dependencies,
   a normal access never loses release dependencies, and
   a node corresponding to a synchronization action never gains any one of acquire dependence and release dependence.

6. The method of claim 4, wherein the comparing that synchronization dependence edges are equivalent to ensure behavior-preservation further comprises ensuring that:
   a normal access never loses acquire dependencies,
   a normal access never loses release dependencies,
   a node corresponding to a synchronization action never gains any one of acquire dependence and release dependence; and
   a node corresponding to an action never gains and/or loses a thread management dependence.

7. The method of claim 4, wherein the comparing that synchronization dependence edges are equivalent to ensure behavior-preservation further comprises ensuring that:
   a normal access never loses acquire dependencies,
   a normal access never loses release dependencies, and
   a node corresponding to a synchronization action never gains any one of acquire dependence and release dependence.

8. The method of claim 1, wherein the comparing the synchronization dependence edges are further defined by
   computing an initial control flow graph (CFG) of the source code; and
   wherein the comparing that synchronization dependence edges are equivalent to ensure behavior-preservation further comprises
      computing synchronization dependencies on the initial CFG;
      performing a refactoring as when applied to a sequential program to form an updated CFG; and
      re-computing synchronization dependencies on the updated CFG.

9. The method of claim 4, wherein the comparing the synchronization dependence edges are further defined by
   computing an initial control flow graph (CFG) of the source code; and
   wherein the comparing that synchronization dependence edges are equivalent to ensure behavior-preservation further comprises
      computing synchronization dependencies on the initial CFG;
      performing a refactoring as when applied to a sequential program to form an updated CFG; and
      re-computing synchronization dependencies on the updated CFG.

10. The method of claim 5 wherein the comparing the synchronization dependence edges are further defined by
    computing an initial control flow graph (CFG) of the source code; and
    wherein the comparing that synchronization dependence edges are equivalent to ensure behavior-preservation further comprises
       computing synchronization dependencies on the initial CFG;
       performing a refactoring as when applied to a sequential program to form an updated CFG; and
       re-computing synchronization dependencies on the updated CFG.

11. The method of claim 1, wherein the comparing that synchronization dependence edges are equivalent to ensure behavior-preservation ensures that a Java Memory Model permits a similar execution of the source code and the transformed source code.

12. The method of claim 1, further comprising:
    wherein in response to any of the synchronization dependence edges and synchronization dependences being not being equivalent an error message is produced.

13. A computer program product for behavior-preserving transformation of a concurrent program, the computer program product comprising:
    a non-transitory computer readable storage medium having computer readable program code embodied therewith, the computer readable program code comprising:
    computer readable program code configured to perform:
       receiving source code with a proposed refactoring operation to be performed;

transforming the source code by applying the proposed refactoring operation to create a transformed source code between two specific elements of the source code;

creating an intermediate representation of the source code including synchronization dependence edges;

creating an intermediate representation of the transformed source code including synchronization dependence edges;

comparing the intermediate representation for the source code and the intermediate representation for the transformed source code, and determining that synchronization dependence edges are equivalent to ensure concurrent behavior-preservation; and in response to the synchronization dependence edges and synchronization dependences being equivalent, saving the transformed source code.

14. The computer program product of claim 13, wherein the comparing that synchronization dependence edges are equivalent to ensure behavior-preservation includes that checking synchronization dependence edges that were present in the intermediate representation for the source code are preserved in the transformed source.

15. The computer program product of claim 13, wherein the source code includes synchronized blocks.

16. The computer program product of claim 13, wherein the comparing the synchronization dependence edges are equivalent to ensure behavior-preservation further comprises identifying in the source code at least one of:

a an acquire dependence from statement A to statement B in some method M, meaning that A corresponds to an acquire action and B executes after A in at least one execution of M;

a release dependence from statement A to statement B in some method M, meaning that statement B corresponds to a release action and B executes after A in at least one execution of M; and a thread management dependence from statement A to statement B in some method M, meaning that statement B corresponds to a thread management action and B executes after A in at least one execution of M.

17. The computer program product of claim 13, wherein the comparing that synchronization dependence edges are equivalent to ensure behavior-preservation further comprises ensuring that:

a normal access never loses acquire dependencies, a normal access never loses release dependencies, and a node corresponding to a synchronization action never gains any one of acquire dependence and release dependence.

18. The computer program product of claim 16, wherein the comparing that synchronization dependence edges are equivalent to ensure behavior-preservation further comprises ensuring that:

a normal access never loses acquire dependencies, a normal access never loses release dependencies, a node corresponding to a synchronization action never gains any one of acquire dependence and release dependence; and a node corresponding to an action never gains and/or loses a thread management dependence.

19. The computer program product of claim 16, wherein the comparing that synchronization dependence edges are equivalent to ensure behavior-preservation further comprises ensuring that:

a normal access never loses acquire dependencies, a normal access never loses release dependencies, and a node corresponding to a synchronization action never gains any one of acquire dependence and release dependence.

20. An information processing system for behavior-preserving transformation of a concurrent program managing variable operand length instructions, the information processing system comprising:

a processor communicatively coupled with a memory, to perform a method comprising:

receiving source code with a proposed refactoring operation to be performed;

transforming the source code by applying the proposed refactoring operation to create a transformed source code between two specific elements of the source code;

creating an intermediate representation of the source code including synchronization dependence edges;

creating an intermediate representation of the transformed source code including synchronization dependence edges;

comparing the intermediate representation for the source code and the intermediate representation for the transformed source code, and determining that synchronization dependence edges are equivalent to ensure concurrent behavior-preservation; and in response to the synchronization dependence edges and synchronization dependences being equivalent, saving the transformed source code.

* * * * *